United States Patent
Falaschi et al.

(10) Patent No.: US 10,161,453 B2
(45) Date of Patent: Dec. 25, 2018

(54) SUPPORT ASSEMBLY FOR MOVABLE SHAFT IN PARTICULAR FOR MACHINERY FOR THE FOOD INDUSTRY

(71) Applicant: Aktiebolaget SKF, Gothenburg (SE)

(72) Inventors: Fabio Falaschi, Massa-Carrara (IT); Fausto Baracca, Massa-Carrara (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/563,363

(22) PCT Filed: Mar. 24, 2016

(86) PCT No.: PCT/IB2016/000369
§ 371 (c)(1),
(2) Date: Sep. 29, 2017

(87) PCT Pub. No.: WO2016/156962
PCT Pub. Date: Oct. 6, 2016

(65) Prior Publication Data
US 2018/0080501 A1     Mar. 22, 2018

(30) Foreign Application Priority Data

Mar. 31, 2015 (IT) .................. 102015000010465

(51) Int. Cl.
*F16C 33/72* (2006.01)
*F16C 35/00* (2006.01)
(Continued)

(52) U.S. Cl.
CPC ............ *F16C 33/723* (2013.01); *F16C 17/02* (2013.01); *F16C 35/00* (2013.01); *F16C 35/02* (2013.01)

(58) Field of Classification Search
CPC ..................................................... F16C 33/723
See application file for complete search history.

(56) References Cited

U.S. PATENT DOCUMENTS 5,172,984 A   12/1992   Lederman
5,380,103 A   1/1995    Lederman
(Continued)

FOREIGN PATENT DOCUMENTS

JP          2005297689 A       10/2005

*Primary Examiner* — Thomas R Hannon
(74) *Attorney, Agent, or Firm* — Bryan Peckjian; SKF USA Inc. Patent Dept.

(57) ABSTRACT

A supporting assembly including a bearing, a bearing housing having an annular element housing and a base for fixing, and a cover for close fluid tight an opening of the housing element; the cover being cup-shaped and including an annular coupling portion to a radially outer lateral surface for housing the annular element. The coupling portion provided radially on the inside with at least a pair of teeth projecting radially towards the inside of the lid; the lateral surface of the annular element housing provided with an annular seat for the teeth of the lid, including: an annular groove disposed axially spaced with respect to a front edge of the housing element; axial grooves equal to the number of teeth present and that radially interrupt the front edge; and a bottom wall provided with a plurality of alternating troughs and projections arranged offset circumferentially with respect to the axial grooves.

9 Claims, 4 Drawing Sheets

(51) Int. Cl.
*F16C 17/02* (2006.01)
*F16C 35/02* (2006.01)

(56) References Cited

U.S. PATENT DOCUMENTS

| | | | | |
|---|---|---|---|---|
| 5,678,934 A * | 10/1997 | Fischer | ................ | F16C 23/084 384/489 |
| 5,947,612 A * | 9/1999 | Dennison Buck | .... | F16C 35/077 384/489 |
| 6,428,213 B1 * | 8/2002 | Parejko | ................ | F16C 33/723 29/898.11 |
| 6,872,005 B2 * | 3/2005 | Steinebach | ........... | F16C 35/045 384/489 |

* cited by examiner

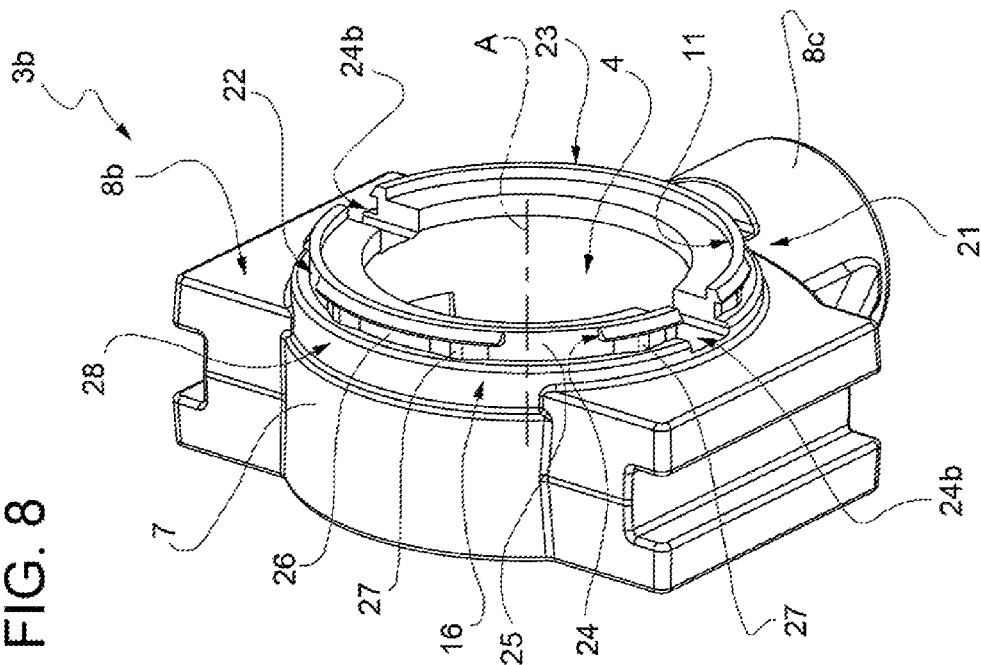
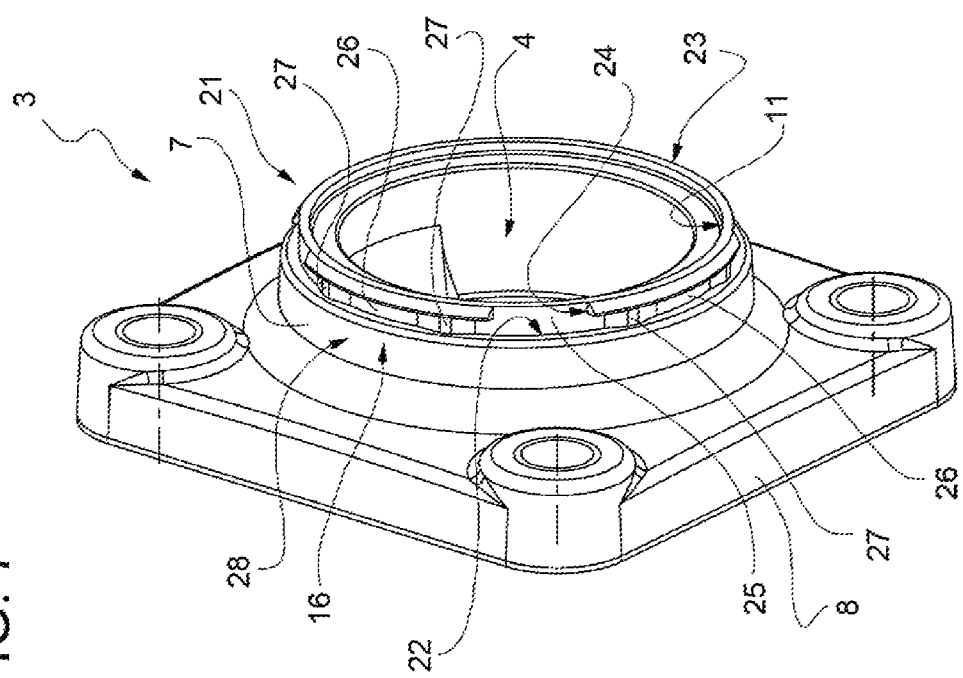

SUPPORT ASSEMBLY FOR MOVABLE SHAFT IN PARTICULAR FOR MACHINERY FOR THE FOOD INDUSTRY

CROSS REFERENCE

This is a United States National Stage Application claiming the benefit of International Application Number PCT/IB2016/000369 filed on Mar. 24, 2016, which claims the benefit of Italian Patent Application 102015000010465 filed on Mar. 31, 2015, both of which are incorporated herein by reference in their entireties.

TECHNICAL FIELD OF THE INVENTION

The present invention relates to a support assembly for machines and, in particular, movable and slidable rods intended to be mounted on machines in the food industry.

KNOWN ART

Machines used in the food industry tend to have many moving parts, including sliding or rotating shafts, such as conveyor belts, kneading machines, and machines for fresh food.

These machines must be cleaned frequently, usually with water and/or detergents and disinfectants, in order to limit the possible occurrence of bacterial colonies which may pollute foods. Such cleaning is necessitated but the small parts, nooks, crannies, and interstices present in such machinery, as these are places in which dirt and/or water may collect and stagnate. The stagnation of liquids or moisture often leads to an increased proliferation of bacteria.

Machines with rods or shafts ending in or passing through machine bearing assemblies may be uniquely susceptible to increased cleaning and/or an increased prevalence of bacteria. These support complexes are generally formed by an annular housing element (which may be provided with a base or mounting flange affixed to the machine), a bearing (typically a rolling bearing, but this could also be a sliding bearing, mounted to the interior of the housing and coupled with a movable shaft), a movable shaft, and a cover (normally cup-shaped and coupled with the element housing, with a central through hole fitted with a seal for the shaft to pass through).

Known assemblies for such covers generally comprise two different types: in a first type, the cover is often snapped into a seat formed on the front of the element housing. In the second type, the cover is snapped about the external portion of the element housing. In this second type, the cover may, for example, engage a seat formed on a radially outer lateral surface of the housing element.

In the first case, the housing creates an annular gap all around the perimeter of the cover. In the second case, since the cover must often be removed for inspection, it is necessary to provide at least one groove for the insertion of a tool (e.g. a screwdriver) to pry the cover free of the housing. Moreover, even in the second case, a gap may still be formed between the lid and outer surface of the housing, due to the type of mechanical coupling used. The creation of such spaces between the housing and the cover element allow nooks in which water and dirt can collect and stagnate and thus such devices are undesirable and may not allow food service establishments to obtain necessary certifications.

Finally, assemblies of the kind described may also have the further drawback of allowing for damage to the cover as a result of repeated assembly and disassembly and/or deterioration of the friction which keeps the cover in place once snap over the housing. Such damage or deterioration may create additional spaced into which water, moisture and dirt can stagnate.

SUMMARY OF THE INVENTION

The object of the present invention is to provide a support assembly for rotatable or slidable shafts, such as those intended to be mounted on machines for use in the food industry, without any of the drawbacks of the known art. Particularly, the object of the present invention is to provide such assemblies which limit the amount of spaces and nooks into which water, moisture, and/or dirt may stagnate, and, further, to provide such assemblies which facilitate easy assembly and disassembly without the use of tools which might damage or loosen the coupling cover or housing element as a result of frequent disassembly.

According to the invention, there is provided a support assembly for movable or slidable shafts having the characteristics set forth in the appended claims.

BRIEF DESCRIPTION OF DRAWINGS

The invention will now be described with reference to the accompanying drawings, which illustrate a non-limiting embodiment thereof, wherein:

FIGS. 7 and 8 illustrate the same perspective view of the front three-quarters of a housing element of the support assembly according to the invention according to two different preferred embodiments, FIG. 7 being relative to the embodiment of FIGS. 1 and 2 and FIG. 8 being relative to a different possible embodiment which differs from that of FIGS. 1 and 2 only for the element shown in the same FIG. 8;

DETAILED DESCRIPTION

Figure 1:
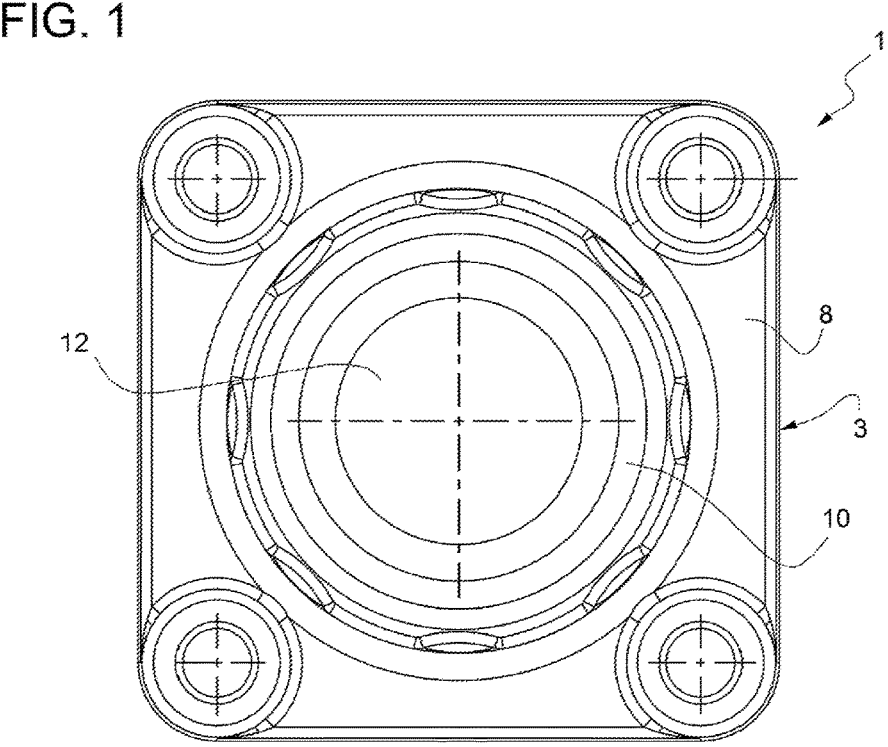
FIG. 1 shows a front elevational view of a non-limiting embodiment of a support assembly for shafts according to the present invention.

With reference to FIGS. 1 to 7, number 1 indicates as a whole a support assembly for movable shafts, rotating or sliding, which have not been illustrated for simplicity sake.

The support assembly 1 comprises a bearing 2 (see FIG. 2), such as a rolling bearing, known and only shown schematically in broken lines for simplicity. The bearing 2 is preferably adapted to receive a movable shaft in a known manner, for example a rotating shaft, and to support said shaft. The figure further shows a bearing housing 3 having a through seat 4 within which is received the bearing 2 in a stable and known manner, therefore not illustrated for simplicity.

The support assembly 1 is in particular intended to be mounted on machines for use in the food industry. For this purpose, the bearing housing 3, which is illustrated in perspective view in FIG. 7, is of the type intended to be rigidly mounted on a machine frame of a known type, not illustrated for simplicity, specifically used in the food industry.

The bearing housing 3 comprises a housing element 7, in the annular complex, designed so as to be adapted to receive in a known manner, the seat 4, the bearing 2, and a base or flange 8 for fastening the bearing housing 3 to the machine frame. Preferably, the seat 4 in general presents an axis of symmetry that is also the axis of symmetry of the element housing 7.

Figure 2:
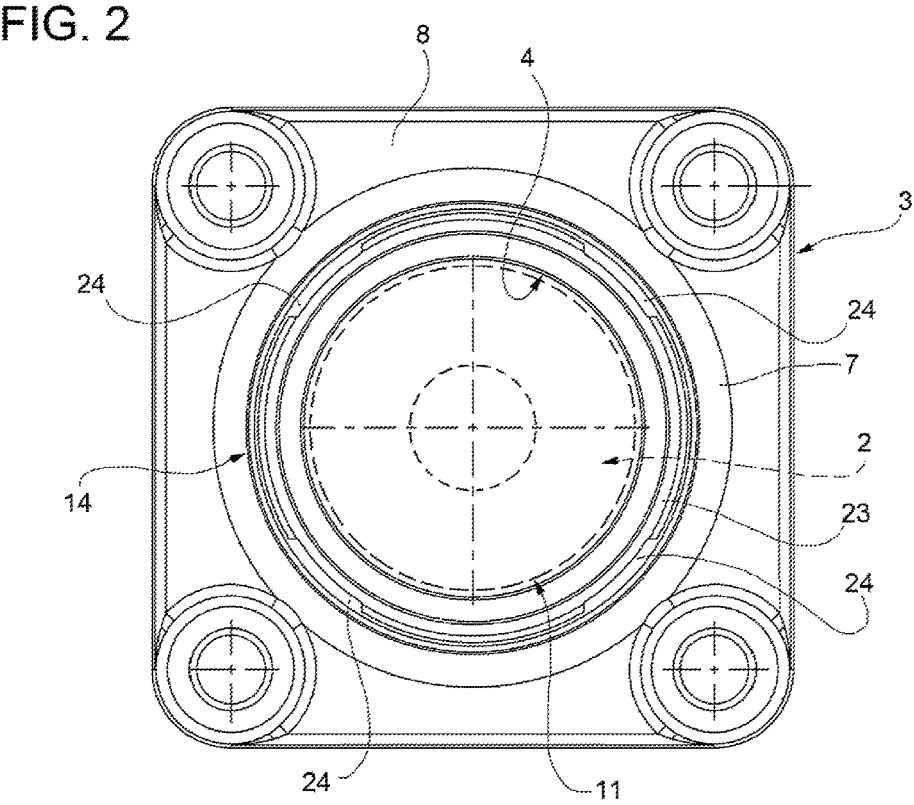
FIG. 2 shows the same view as FIG. 1, but with an element (the cover) removed.

The bearing housing 3 illustrated in FIGS. 1, 2 and 7 is only one of the possible preferred embodiments. For example, the base or flange 8, which is square in the illustrated example, can take on other symmetrical or asymmetrical shapes, or may be formed and offset to one side relative to the housing 7. With reference to FIG. 8, where there is shown a housing of the bearing 3b variant 3 and where the similar or identical details to those of the bearing housing 3 of FIG. 7 are indicated for simplicity with the same reference numbers, the flange 8 of the bearing housing 3 is replaced by a base 8b that extends on both sides of the housing element 7, and by a substantially cylindrical support 8c which extends radially from the element of the housing 7.

In any case, the support assembly 1 always also comprises a cover 10 to close fluid tight an opening 11 of the inner housing 4 of the housing element 7 of the bearing housing 3 or 3b. The inner housing 4 forms a seat 4, in which bearing 2 is mounted.

The lid 10 for the bearing housing 3 or 3b is generally cup-shaped and comprises (see FIGS. 3-6) a bottom wall 12, an annular side wall 13 which extends transversely to the bottom wall 12, and a coupling portion 14 toward the bearing housing 3 or 3b.

The coupling portion 14 is annular, is formed integrally in one piece on one end 15 of the side wall 13 opposite to the bottom wall 12, and is designed to be coupled with the bearing housing 3 or 3b, preferably being positioned laterally outside the bearing housing 3 or 3b. In the present case, the coupling portion 14 is shaped as a cup joint and is coupled laterally and radially on the outside on a lateral surface 16 radially outside of the annular housing 7, always present in any form of realization of the bearing housing 3 (or 3b).

The side surface 16 and the coupling portion 14 are defined by a circular piece and have a common axis of symmetry coincident, in the illustrated examples, with an axis of symmetry A (see FIGS. 4 and 5) of the lid 10 and which is also the ' of the housing 7 of the symmetry axis (see FIG. 8) and the seat 4.

According to a first feature of the invention, the cover 10 is made of a single piece of synthetic plastic material selected appropriately, and the coupling portion 14 is provided on the side opposite to the bottom wall 12 of an annular sealing lip 18. The annular sealing lip 18 preferably extends frontally projecting from a front edge 19 (see FIGS. 4-6) of the coupling portion 14 and is preferably made of the same synthetic plastic material of the lid 10 so as to be elastically deformable in the radial direction from the inside towards the outside.

According to a further aspect of the invention, the coupling portion 14 of the cover 10 is provided radially on the inside of at least a pair of teeth 20 protruding radially towards the inside of the lid 10 and spaced circumferentially between them, which each extend for a limited circumferential portion of the coupling portion. The figures, which show a non-limiting embodiment as an example, include four teeth 20 spaced apart by 90°.

According to another aspect of the invention, in some embodiments in which teeth 20 are present on the lid, the radially outer lateral surface 16 of housing annular element 7 is provided with an annular seat 21 for receiving the teeth 20 of the cover 10.

Figure 9:
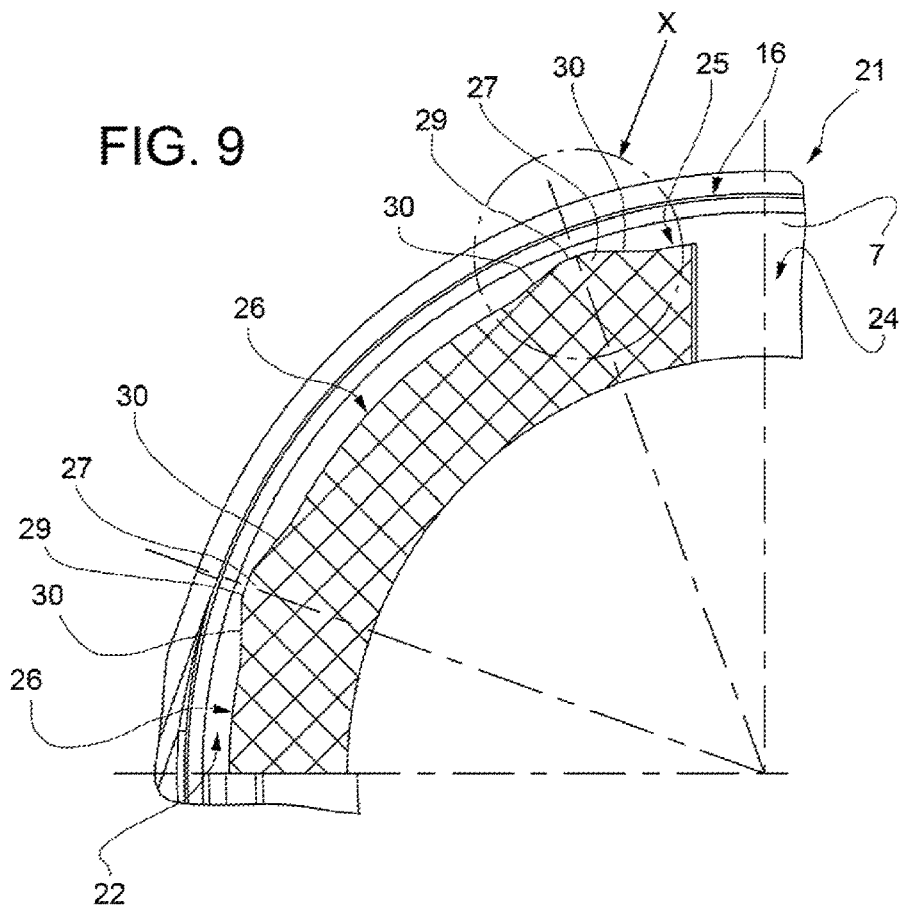
FIG. 9 is an enlarged front elevational view and partial cross-section of a portion of a same detail of the housing elements illustrated in FIGS. 7 and 8.
Figure 10:
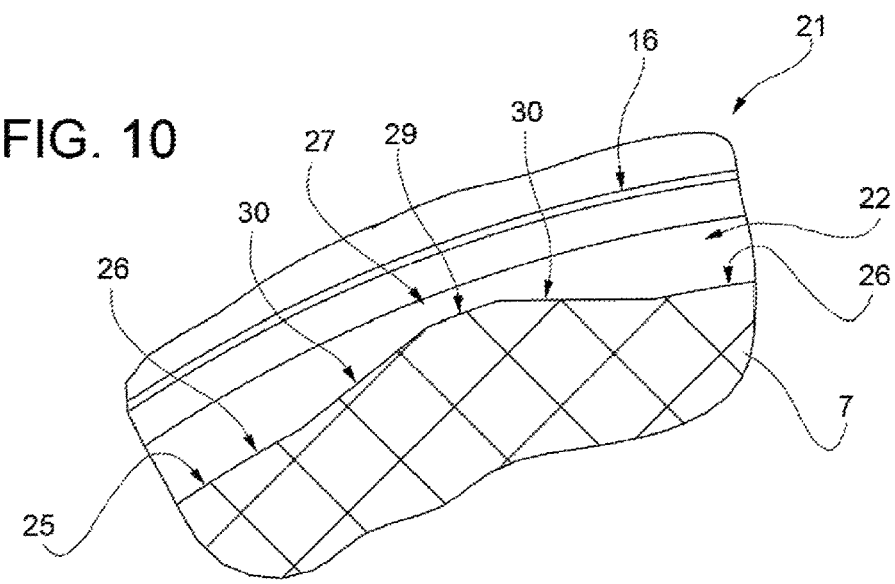
FIG. 10 illustrates a further enlarged view of a detail of FIG. 9.

The annular seat 21 (see FIGS. 7-10, for example) consists, according to the invention, of an annular groove 22 axially spaced away from a front edge 23 of the housing 7. Such a space delimits the mouthpiece 11. The annular seat 21 may include several axial grooves 24 equal to the number of the teeth 20 on the cover 10, wherein these grooves 24 radially interrupt at least part of the front edge 23 of the housing element 7. The annular seat may further include a circumferentially alternating plurality of hollows 26 and projections 27 in a bottom wall 25 of the annular groove 22, arranged offset circumferentially with respect to the axial grooves 24. Further axial grooves 24b (see FIGS. 8 and 9) may be present for the insertion of mounting tools.

Figure 6:
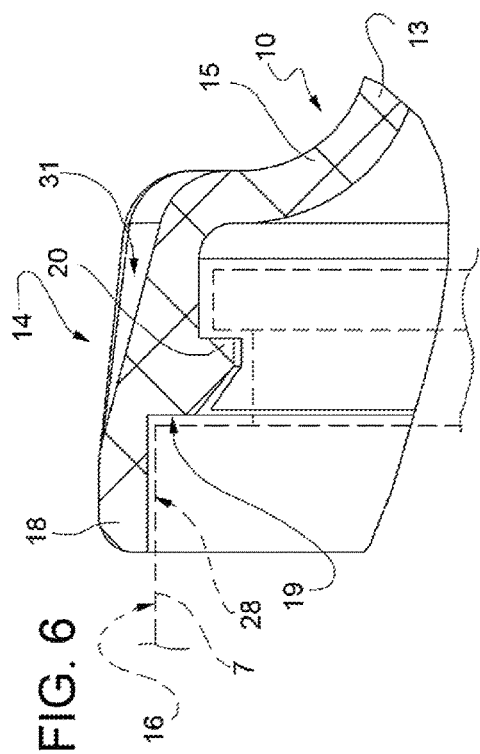
FIG. 6 illustrates an enlarged view of a detail of FIG. 5.
Figure 5:
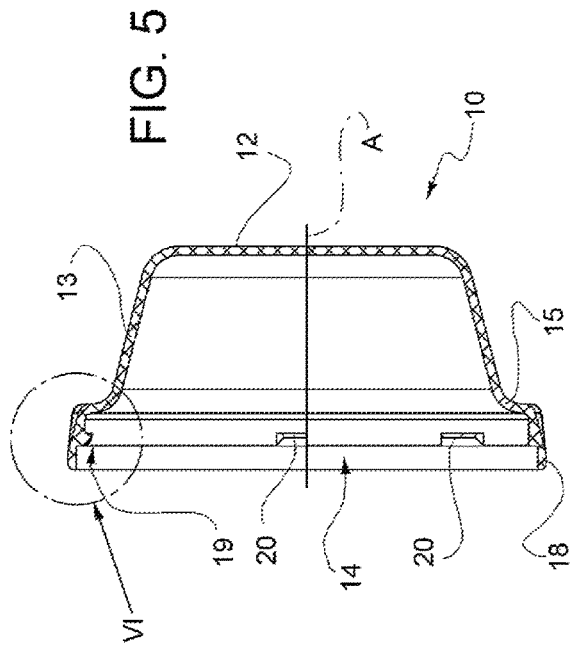
FIGS. 4 and 5 show cross-sectional views according to a plane indicated by IV-IV and V-V, respectively, the element of FIG. 3.
Figure 3:
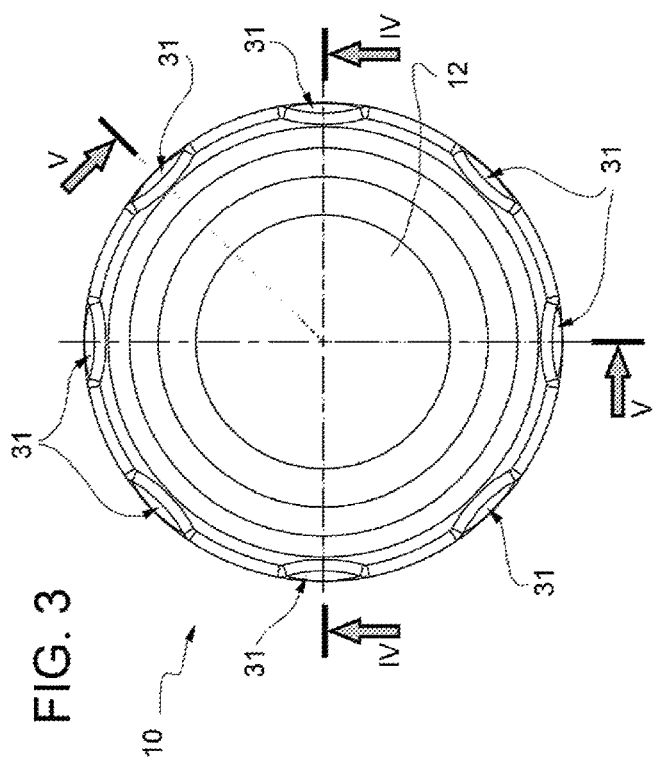
FIG. 3 shows a front elevational view of the cover which was shown removed in FIG. 2.
Figure 4:
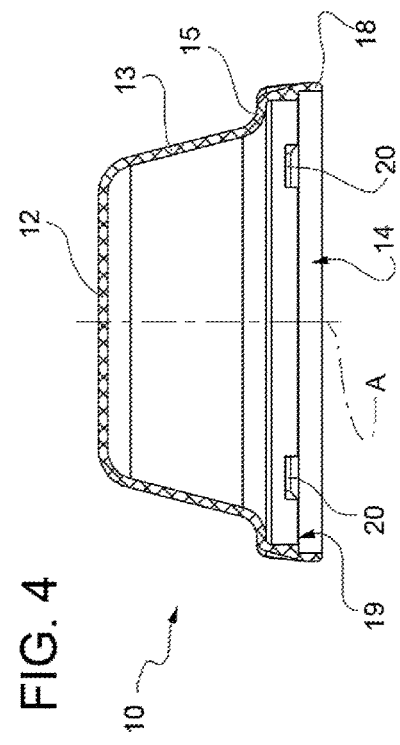

The annular sealing lip 18 mates, in a fluid tight manner and with radial interference, with a portion 28 of the radially outer lateral surface 16 of housing annular element 7, as only schematically shown out of scale and in broken lines in FIG. 6. The portion 28 is disposed on the side opposite to the front edge 23 with respect to the annular groove 22 and consists of a portion of a conical surface tapering towards the cover 10.

Here and hereinafter, the terms "taper" and "tapering" of a conical or frusto-conical surface means the side toward which the vertex of the geometric cone facing bounding this surface. Thus, the housing 7 annular element tapers in correspondence with the conical surface portion 26 to progressively decrease its radial thickness toward the lid 10.

The section of the conical surface 26 defining the tract of the radially outer lateral surface 16 of housing annular element 7, which is coupled with interference with the annular lip 18, has, according to a further aspect of the invention, an inclination with respect to its axis of symmetry equal to an acute angle and preferably less than 10°. Furthermore, the cover 10 and the annular sealing lip 18 are made of a polymeric material, preferably but not necessarily polyurethane, by molding in a single piece.

The axial grooves 24 may have a radial depth identical to the radial depth of the annular groove 22 at the axial grooves 24, so that respective bottom walls of the axial grooves and the bottom wall 25 of the radial groove 22 are arranged flush with each other.

The projections 27 of the bottom wall 25 of the annular groove 22 (as in FIGS. 9 and 10) each comprise a first portion 29 of a circumferential flat surface (which may also be referred to herein as a circumferential raised flat surface) with respect to the bottom wall 25 of the annular groove 22 and a pair of second portions of the circumferential flat surface 30 that flank the first segment 29 and form two inclined planes that connect the first surface section 29 with the bottom wall 25 of the annular groove 22.

As stated previously, in the illustrated preferred embodiment, the cover 10 has two pairs of teeth 20, spaced circumferentially and arranged in a symmetrical manner 90° apart. In such embodiments, the radially outer lateral surface 16 of the housing element 7 has two pairs of axial grooves 24 arranged circumferentially and spaced in a symmetrical manner, displaced by 90°. The bottom wall 25 of the annular groove 22 has a plurality of circumferential sectors, each having the same angular width and consisting of eight depressions 26, four of which are delimited axially by the edge 23 and the other four free as arranged in correspondence of the grooves 24, and eight projections 27. The depressions 26 are delimited by curved surfaces disposed substantially flush with the bottom wall 25 of the annular groove 22, while the projections 27 project radially with respect to the bottom wall 25 of the annular groove 22. The depressions 26 and projections 27 are preferably arranged in an alternating fashion.

According to a further aspect of the invention, a plurality of circumferential depressions 31 are arranged on the outside of the cover 10 (see FIGS. 3 and 6) and spaced evenly along the circumference of the cover 10. It is preferred that the circumferential depressions 31 are shaped to facilitate gripping (for example, designed to each receive a user's finger). Such a configuration may allow a user to manually rotate the cover 10 about the housing 7.

The circumferential depressions 31 are formed radially on the outside of the cover 10 on the coupling portion 14, and are made to thin the coupling portion 14 along those points where the depressions 31 are present. According to an aspect of the invention, the teeth 20 of the cover 10 are then formed radially on the inside of the coupling portion 14, each being formed by a respective circumferential depression 31.

The depressions 31 weaken the cover 10 so as to make the coupling portion 14 elastically deformable radially outwardly at points corresponding with the placement of the teeth 20. In order to have an optimal combination of stiffness and flexibility of the cover 10, the teeth 20 are formed substantially at the front edge 19 (see FIG. 6).

This configuration ensures that the coupling between lid 10 and housing element 7 presents no gap that can become a receptacle for moisture and/or dirt but is instead self-draining. In addition, the lip 18 may form a hydraulic seal when formed of the same preferred plastic materials as the cover 10, which may preventing the entry of dirt and/or water into the seat 4.

Finally, the innovative mechanical coupling between cover 10 and housing element 7 allows users to remove and replace the cover 10 indefinitely without damaging it, by simply turning the cover 10 either clockwise or anti-clockwise and then sliding the teeth 20 through the grooves 24, as in a bayonet coupling. However, unlike traditional bayonet couplings, the coupling according to the invention includes projections 27 and the depressions 26 such that, when the cover 10 is installed, it is also blocked circumferentially and therefore accidental disassembly is prevented.

To attach the cover 10, a user must bring the teeth 20 within the groove 22 and then rotate the lid 10. This rotation causes the teeth 20 to engage the oblique surface 30 of the projections 27 immediately adjacent to each tooth in the direction of rotation. The projections 27 push each tooth 20 up, continuing the rotation progressively towards the portion of flat surface 29. Such movement may be allowed by the elasticity of the lid 10 when it is in contact with the teeth 20. The thinning by the depressions 31 and a suitable choice of material polymer for forming the cover 10, preferably but not necessarily polyurethane, may better facilitate such action. This movement also causes a certain resistance to rotation which can be detected by the user. Continuing the rotation in the same direction, the tooth 20 may then descend along the other portion of the inclined surface 30 opposite the previous one and "fall" into a depression 26, which is delimited between two adjacent projections 27. The tooth 20 preferably snaps in place and is therefore locked against rotation.

To remove the cover 10 a user must simply rotate the cover 10 in either direction to engage the tooth 20 with one of the two projections 27 adjacent to it, moving the tooth 20 into another depression 26 arranged in correspondence with a groove 24. It is therefore possible in this position to remove the lid from the element 10 of housing 7 simply making it translate axially.

All the objects of the invention are thus achieved.

The invention claimed is:

1. A bearing assembly for movable, rolling or sliding shafts, comprising:
   a bearing adapted to receive the movable shaft,
   a bearing housing having an annular housing element and a fixing base or flange, and
   a cover for fluid-tightly closing an inlet opening of an inner seat of the housing element within which the bearing is mounted; the cover providing a bottom wall, an annular lateral wall that extends transversely to the bottom wall, and an annular coupling portion that extends toward a radially outer lateral surface of the annular housing element, the coupling portion being integrally obtained on one end of the lateral wall of the cover, opposite to the bottom wall; wherein, in combination:
   the cover is made in one piece of a synthetic plastic material and has the coupling portion thereof radially provided on the inside of at least one pair of teeth, radially projecting towards the inside of the cover and circumferentially spaced apart from each other, which extend each over a limited circumferential stretch of the coupling portion;
   the radially outer lateral surface of the annular housing element is provided with an annular seat for receiving the teeth of the cover, the annular seat including: an annular groove arranged so as to be axially spaced apart with respect to a frontal rim of the housing element delimiting the inlet opening; a number of axial grooves equal to the number of teeth present on the cover and which radially interrupt at least part of the frontal rim of the housing element; and a bottom wall of the annular groove which is circumferentially provided with an alternating plurality of depressions and projecting parts, the projecting parts being arranged so as to be circumferentially staggered with respect to the axial grooves.

2. The bearing assembly according to claim 1, wherein the coupling portion is provided on the side opposite to the bottom wall of the cover with an annular sealing lip which frontally extends so as to protrude from the frontal rim of the coupling portion and which is made of the same synthetic plastic material as the cover so as to be elastically deformable in radial direction from the inside outwards;
   the annular sealing lip being coupled in a fluid-tight manner and with radial interference to a stretch of the radially outer lateral surface of the annular housing element arranged on the opposite side of the frontal rim with respect to the annular groove and consisting of a conical surface stretch having its taper facing the cover.

3. The bearing assembly according to claim 2, wherein the conical surface stretch defining the stretch of the radially outer lateral surface of the annular housing element which is coupled with interference to the annular lip has an inclination with respect to a symmetry axis thereof forming an acute angle of less than 10°.

4. The bearing assembly according to claim 2 wherein the cover and the annular sealing lip are made of polyurethane, by single-piece molding.

5. The bearing assembly according to claim 1, wherein the axial grooves have a radial depth identical to that of the annular groove obtained on the radially outer lateral surface of the housing element at the axial grooves themselves, so that respective bottom walls of the axial grooves and of the annular groove are arranged flush with one another.

6. The bearing assembly according to claim 1, wherein the projecting parts of the bottom wall of the annular groove each include a first circumferential stretch of flat surface raised above the bottom wall of the annular groove and a pair of second circumferential stretches of flat surface which flank the first stretch and form two inclined planes which connect the first surface stretch to the bottom wall of the annular groove.

7. The bearing assembly according to claim 1, wherein the cover has two pairs of teeth arranged so as to be symmetrically circumferentially spaced apart, staggered by 90°; the radially outer lateral surface of the housing element having two pairs of axial grooves arranged so as to be symmetrically circumferentially spaced apart, staggered by 90°; and the bottom wall of the annular groove having eight circumferential sectors having the same angular width, consisting of four depressions delimited by four curved surfaces arranged substantially flush with the bottom wall of the annular groove and of four projecting parts which radially protrude with respect to the bottom wall of the annular groove, arranged alternating with the depressions.

8. The bearing assembly according to claim 1, wherein the cover is radially provided on the outside with a plurality of circumferential recesses arranged so as to be circumferentially evenly spaced apart from one another, which are shaped so as to form respective gripping elements adapted to allow a user to manually rotate the cover with respect to the housing element.

9. The bearing assembly according to claim 8, wherein the circumferential recesses are obtained radially on the outside on the coupling portion and are made so as to make radially thinner the coupling portion at the circumferential recesses themselves; the teeth of the cover being radially obtained on the inside of the coupling portion, at respective circumferential recesses, the latter weakening the cover so as to make the coupling portion elastically deformable radially outwards at least at the teeth.

* * * * *